United States Patent [19]

Chang et al.

[11] Patent Number: 5,325,536
[45] Date of Patent: Jun. 28, 1994

[54] LINKING MICROPROCESSOR INTERRUPTS ARRANGED BY PROCESSING REQUIREMENTS INTO SEPARATE QUEUES INTO ONE INTERRUPT PROCESSING ROUTINE FOR EXECUTION AS ONE ROUTINE

[75] Inventors: Hungkun J. Chang, Schaumburg; John M. Kaczmarczk, Niles; Richard E. White, Schaumburg; James D. McGrath, Wheeling, all of Ill.

[73] Assignee: Motorola, Inc., Schaumburg, Ill.

[21] Appl. No.: 982,101

[22] Filed: Nov. 24, 1992

Related U.S. Application Data

[63] Continuation of Ser. No. 447,456, Dec. 7, 1989, abandoned.

[51] Int. Cl.⁵ .............................................. G06F 13/24
[52] U.S. Cl. .................................... 395/725; 395/375; 364/242.2; 364/DIG. 1
[58] Field of Search ................................. 395/725, 375

[56] References Cited

U.S. PATENT DOCUMENTS

| | | | |
|---|---|---|---|
| 3,774,163 | 11/1973 | Recoque | 395/650 |
| 4,271,468 | 6/1981 | Christensen et al. | 395/275 |
| 4,342,082 | 7/1982 | Brown et al. | 395/725 |
| 4,438,489 | 3/1984 | Heinrich et al. | 395/725 |
| 4,484,271 | 11/1984 | Miu et al. | 395/375 |
| 4,636,944 | 1/1987 | Hodge | 395/725 |
| 4,658,351 | 4/1987 | Teng | 395/650 |
| 4,860,190 | 8/1989 | Kaneda et al. | 395/275 |
| 4,888,691 | 12/1989 | George et al. | 395/700 |
| 5,179,685 | 1/1993 | Nojiri | 395/425 |

FOREIGN PATENT DOCUMENTS

62-257539 11/1987 Japan.

Primary Examiner—Parshotam S. Lall
Assistant Examiner—William M. Treat
Attorney, Agent, or Firm—Val Jean F. Hillman

[57] ABSTRACT

Multiple interrupt request data is stored in a queue and handled by a single interrupt sub-routine to provide a batch handling capability to maximize the interrupt handling efficiency of a microprocessor. Events are organized into groups having a common interrupt handling requirement and a data storage queue is provided for each group. At least one data word is stored for each event requiring interrupt attention in a respective queue. An interrupt handling routine upon a single call handles all data words within a queue before exiting the interrupt handling routine.

6 Claims, 1 Drawing Sheet

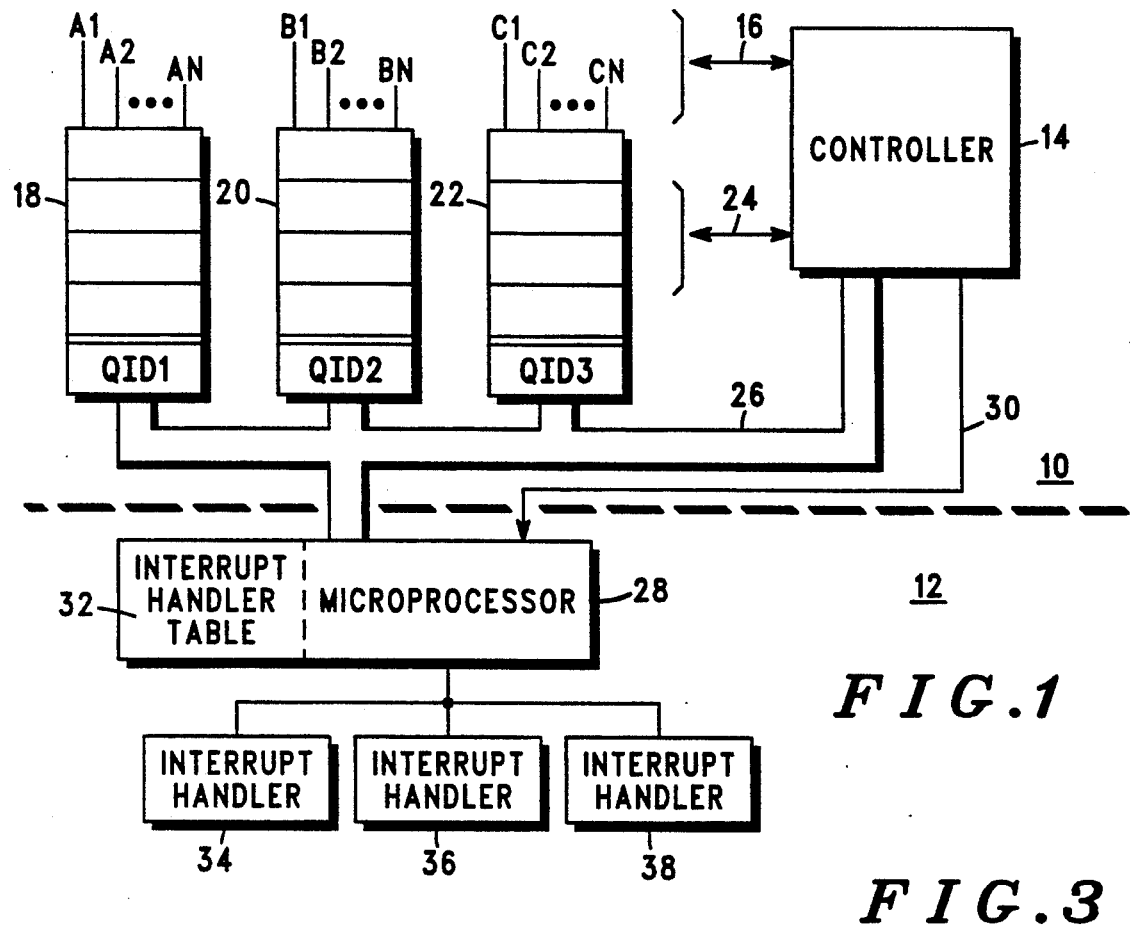

LINKING MICROPROCESSOR INTERRUPTS ARRANGED BY PROCESSING REQUIREMENTS INTO SEPARATE QUEUES INTO ONE INTERRUPT PROCESSING ROUTINE FOR EXECUTION AS ONE ROUTINE

This is a continuation of copending application Ser. No. 07/447,456, filed on Dec. 07, 1989, now abandoned.

BACKGROUND OF THE INVENTION

This invention is directed to microprocessor interrupt methods and is more specifically directed to handling multiple interrupt requests which occur in a short time interval as compared with the microprocessor speed.

Various types of microprocessor interrupt methods are known. In one method the microprocessor upon receiving an interrupt request polls a plurality of connected devices to determine which device initiated the request. This allows the microprocessor to serve a plurality of connected devices, but is inefficient in that the polling sequence may be time consuming. Such inefficiencies are especially evident in "bursty" data handling systems in which a plurality of interrupts occur within a short time interval.

Microprocessors such as the Motorola 68000 processor allow a vector interrupt method. In this method the microprocessor upon receiving an interrupt request also reads certain information on a bus and interprets such information as a vector. The microprocessor contains a predetermined table of software directives. The vector identifies one such directive which is then executed by the microprocessor. Upon completion of the interrupt handling program pointed to by the microprocessor directive, control is returned to the operating software environment for further processing including further interrupt handling. This method handles interrupts on an event by event basis.

Although the vector interrupt method represents an improvement over the polling interrupt method for bursty interrupt environments, a substantial amount of overhead processing time is used to handle interrupt requests in close time proximity requiring multiple reentries to the interrupt handler. Thus, there exists a need for an improved interrupt handling method which maximizes the ability of a microprocessor to respond to a plurality of closely spaced interrupt requests.

OBJECT OF THE INVENTION

It is an object of the present invention to provide an improved interrupt handling method in which multiple interrupt requests can be serviced without requiring separate interrupt requests for each event.

BRIEF DESCRIPTION OF THE DRAWINGS

FIG. 1 is a block diagram of a computing system which incorporates an improved interrupt handling method in accordance with the present invention.

FIG. 2 is a flow diagram illustrating the initial handling of an interrupt request by the microprocessor.

FIG. 3 is a flow diagram illustrating an interrupt handling sub-routine.

DETAILED DESCRIPTION OF THE INVENTION

FIG. 1 illustrates a computing system which includes a sub-system 10 shown above the dashed line which operates under the control of a master sub-system 12. Sub-system 10 includes a controller 14 which may include a microprocessor or a state machine implementation. Events A1, A2 ... AN, B1, B2 ... BN, and C1, C2 ... CN are monitored by sub-system 10 and are segregated into a family of events having common interrupt handling requirements. The status of these events are monitored by controller 14 via communication bus 16.

Event groups A, B, and C are associated respectively with queues 18, 20, and 22. Each queue consists of a plurality of memory locations. At least one byte of information or vector is stored for each event when an interrupt is required. Queues 18, 20, and 22 have a predetermined stored identifications QID1, QID2, and QID3, respectively. Communication bus 24 which is coupled between controller 14 and the queues enables the controller to write appropriate vectors corresponding to events which will require attention by means of an interrupt to associated queues. In the illustrative embodiment, each queue can store up to four vectors representing four different events in each group for which interrupt attention is needed. A data bus 26 couples controller 14 with each of the queues and with microprocessor (MPU) 28 which resides within sub-system 12. A control line 30 enables controller 14 to initiate an interrupt request of the MPU.

The MPU contains an interrupt handler table 32 in which the QID's function as addresses. Each QID addresses a corresponding software directive previously entered in the table. Interrupt handlers 34, 36, and 38 are coupled to MPU 28 and consist of software programs which handle interrupt requests corresponding to events associated with queues 18, 20, and 22, respectively. Each of the QID's are referenced by interrupt handler table 32 to a corresponding interrupt handler 34, 36, and 38, respectively. It should be apparent to those having skill in the art that other interrupt requirements not associated with events A, B, or C could be handled by MPU 28 wherein interrupt handler table 32 contains other software directives addressed by vectors associated with the other events.

FIG. 2 illustrates the initial handling of an interrupt according to the present invention by microprocessor 28. It will be understood that the illustrative method operates as part of a general operating system of the microprocessor in which it will control but a part of the overall instructions for the MPU. This method begins by microprocessor entering these instructions at start 50 in response to an interrupt request having been received. The MPU must then make a decision 54 as to whether or not send an acknowledgement. If the decision is NO, such as when higher priority actions are required, the interrupt is postponed and the program exits at exit 56 returning to the operational program of the MPU. If the MPU acknowledgement is sent, a YES decision, the MPU then proceeds at block 58 to read a QID present on bus 26. This of course requires that controller 14 write the QID corresponding to the queue having an interrupt need upon receiving the MPU acknowledgement.

Next, the MPU at block 60 uses the QID to address the interrupt handler table and fetch the corresponding software directive. Control then exits by block 62 wherein the MPU passes control to the interrupt handler routine as determined by the directive previously read in table 32.

FIG. 3 illustrates an exemplary interrupt handler routine which is entered by control being passed by block 62 in FIG. 2 to entry block 64 in FIG. 3. Upon entering the interrupt handler routine, parameter i is set to 1 by block 66. In block 68, the MPU reads the i'th event data in the queue. Data relating to several different events may be stored in the queue. Upon reading the i'th event data, the microprocessor handles the data in a predetermined manner as indicated in block 70. This may merely consist of writing the data to another location to be later acted upon by a different software routine or may comprise a calculation or other activity. Following the handling of the event data by block 70, the MPU makes an inquiry to determine if more event data is stored in the queue by block 72. If at least one more data entry occurs in the event queue (YES) then the parameter i is incremented by one and control is passed back to block 68 so that the data can be acted upon by block 70. All the data within a given queue is acted upon in the same manner by block 70. Thus, multiple events requiring interrupt handling of the same type can be processed while still in the interrupt handling routine, i.e., control is not returned to the general MPU operational program. After all of the data in the queue has been read by block 72 (a NO decision), control passes by exiting at block 76 back to the microprocessor operational program.

It will be appreciated that FIG. 3 represents only one interrupt handling sub-routine which corresponds to one queue and one set of events. In the illustrative embodiment each interrupt handler would preferably have a separate routine similar to that of FIG. 3 to carry out a predefined process corresponding to the particular event group. Thus, all events requiring an interrupt associated with one group are handled by only one sub-routine call. This provides for improved efficiencies especially where several related events require interrupt attention within a short interval relative to the MPU.

In the illustrative embodiment, all events associated with one queue requiring interrupt service will be cleared or processed by the microprocessor before exiting the interrupt handling routine. If a plurality of events in different groups have interrupt handling needs such that each of the queues contain event data corresponding to several events, the present invention contemplates the use of pre-assigned priority in which the interrupt service would be handled from queue 18, then 20, then 22. This disposes of multiple interrupt requirements of the same priority within a single interrupt handling routine.

This invention further contemplates that a single interrupt handling routine could process all event data associated with all of the queues before leaving the interrupt handling routine. A method to handle this implementation would link each of the interrupt handler routines sequentially to each other with the entry to each routine having an additional inquiry to determine if any event data is stored in the associated queue. Thus, each of the events stored in all of the queues could be handled in one interrupt handling occurrence before releasing the microprocessor for other activities.

The method according to the present invention permits an MPU running at a speed that is lower than would otherwise be required to handle bursty interrupt demands. The present invention eliminates the overhead processing associated with frequent reentry into an interrupt handling sequence due to frequently reoccurring events of a similar nature.

Although an exemplary embodiment of the present invention has been described and illustrated in the drawings, the scope of the invention is defined by the following claims.

What is claimed is:

1. A method for organizing and handling recurring microprocessor interrupts within a microprocessor based computing system comprising the steps of:
    organizing events into respective groups which have common interrupt handling requirements, each respective group having a different set of interrupt handling requirements;
    providing different interrupt handling routines for each group;
    providing a data storage queue for each group;
    storing at least one data word for each event requiring interrupt attention in its respective queue;
    linking together at least some of the different interrupt handling routines into a linked interrupt handling routine; and
    initiating the linked interrupt handling routine whereby each data word in each queue associated with the linked interrupt handling routine is serviced by the microprocessor before exiting the linked interrupt handling routine.

2. The method according to claim 1 wherein said step of linking at least some of the different interrupt handling routines comprises the step of identifying the queues to be serviced.

3. The method according to claim 2 wherein said step of identifying the queues to be serviced includes the step of designating each queue with unique queue identification data and sending the queue identification data of each queue having at least one data word stored therein to the microprocessor.

4. The method according to claim 3 further comprising the step of utilizing the queue identification data sent to the microprocessor to determine which of the different interrupt handling routines are selected for linking.

5. In a computing system having a master sub-system and at least one slave sub-system in which a plurality of events are monitored, a method for organizing and handling recurring microprocessor interrupts comprising the steps of:
    organizing events into respective groups which have common interrupt handling requirements, each respective group having a different set of interrupt handling requirements;
    providing a different interrupt handling routine for each group;
    providing a data storage queue for each group;
    storing at least one data word for each event requiring interrupt attention in its respective queue;
    sequentially linking together different interrupt handling routines into a linked interrupt handling routine; and
    initiating the linked interrupt handling routine whereby each data word in each queue associated with the linked interrupt handling routine is serviced by a microprocessor in the master sub-system before exiting the linked interrupt handling routine.

6. The method according to claim 5 wherein said step of linking of the different interrupt handling routines further comprises the step of determining if any event data is stored in the queues to be serviced.

* * * * *